US008125566B2

(12) United States Patent
Matsubara

(10) Patent No.: US 8,125,566 B2
(45) Date of Patent: Feb. 28, 2012

(54) SEQUENTIAL SCANNING CONVERSION DEVICE AND METHOD

(75) Inventor: Shogo Matsubara, Musashino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 427 days.

(21) Appl. No.: 12/488,385

(22) Filed: Jun. 19, 2009

(65) Prior Publication Data

US 2009/0316045 A1 Dec. 24, 2009

Related U.S. Application Data

(63) Continuation of application No. PCT/JP2008/065063, filed on Aug. 19, 2008.

(30) Foreign Application Priority Data

Oct. 31, 2007 (JP) ................................. 2007-284095

(51) Int. Cl.
*H04N 7/01* (2006.01)
(52) U.S. Cl. ....................................... 348/452; 348/448
(58) Field of Classification Search .................. 348/441, 348/443, 446, 448, 451, 452, 455, 456, 458, 348/459; *H04N 7/01, 11/20*
See application file for complete search history.

(56) References Cited

U.S. PATENT DOCUMENTS

| | | | |
|---|---|---|---|
| 6,025,818 A | 2/2000 | Okano | |
| 7,031,388 B2 | 4/2006 | Yang et al. | |
| 7,705,914 B2 * | 4/2010 | Yamauchi | 348/448 |
| 2004/0125231 A1 | 7/2004 | Song et al. | |
| 2005/0151878 A1 | 7/2005 | Kasahara et al. | |
| 2008/0151107 A1 * | 6/2008 | Yamauchi | 348/452 |

FOREIGN PATENT DOCUMENTS

| | | |
|---|---|---|
| JP | 02-272984 | 11/1990 |
| JP | 05-022463 | 1/1993 |
| JP | 06-062378 | 3/1994 |
| JP | 2000-175159 | 6/2000 |
| JP | 2001-075525 | 3/2001 |
| JP | 2001-197450 | 7/2001 |
| JP | 2004-007568 | 1/2004 |
| JP | 2004-215263 | 7/2004 |
| JP | 2006-311277 | 11/2006 |

OTHER PUBLICATIONS

International Search Report and Written Opinion in a corresponding Japanese application No. PCT/JP2008/065063 filed Aug. 19, 2008.

* cited by examiner

*Primary Examiner* — Sherrie Hsia
(74) *Attorney, Agent, or Firm* — Blakely, Sokoloff, Taylor & Zafman LLP

(57) ABSTRACT

According to one embodiment, a motion detection correction module is provided which corrects the result of detection by a motion detector, which detects motion in one frame on a pixel-by-pixel basis, for each of small regions obtained by dividing the entire picture on the basis of the result of detection by a picture-based illumination component variation detector that detects interfield illumination component variations on a picture-by-picture basis and the result of detection by a block-based illumination component variation detector that detects interfield illumination component variations on a small-region-by-small-region basis.

9 Claims, 12 Drawing Sheets

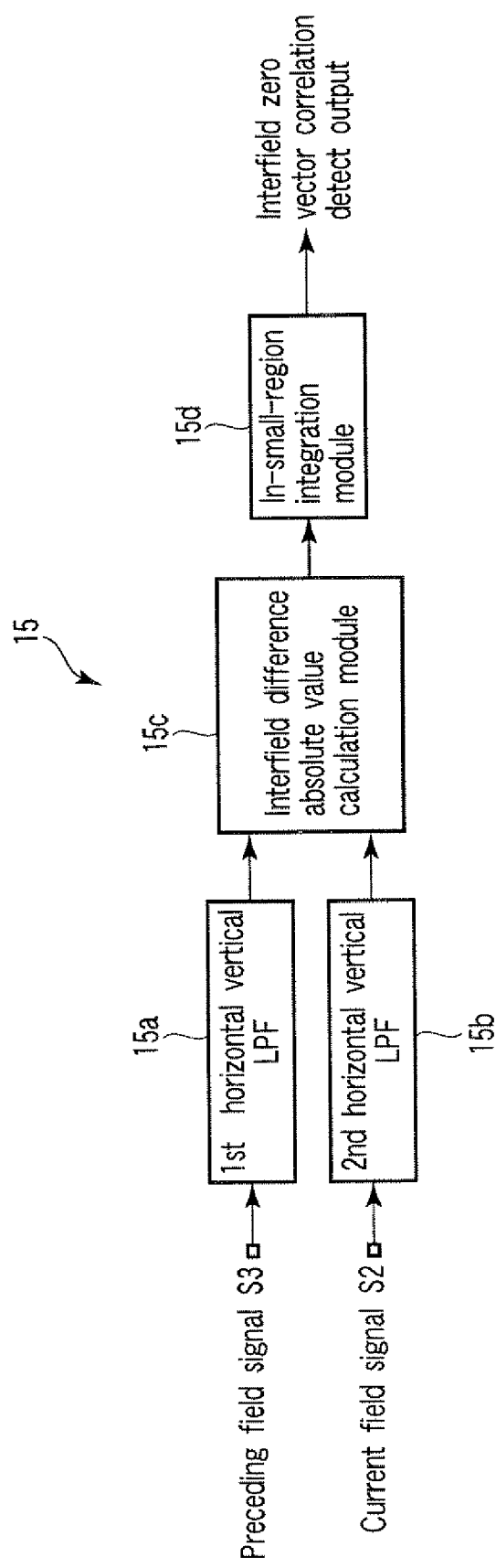
F I G. 2

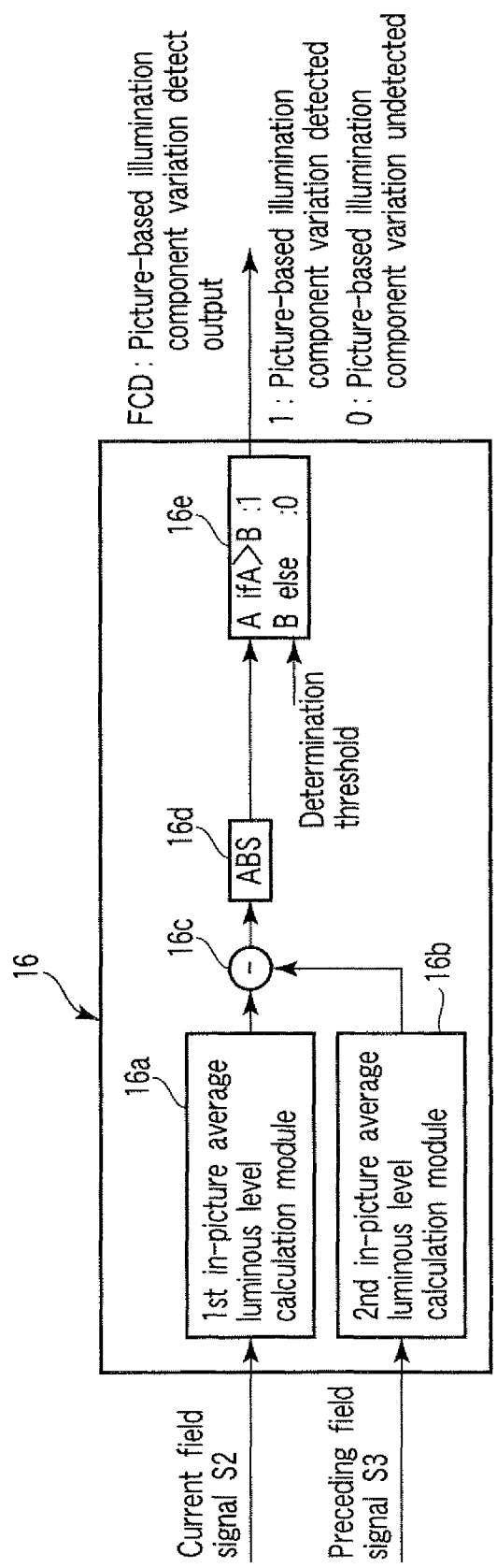
F I G. 5

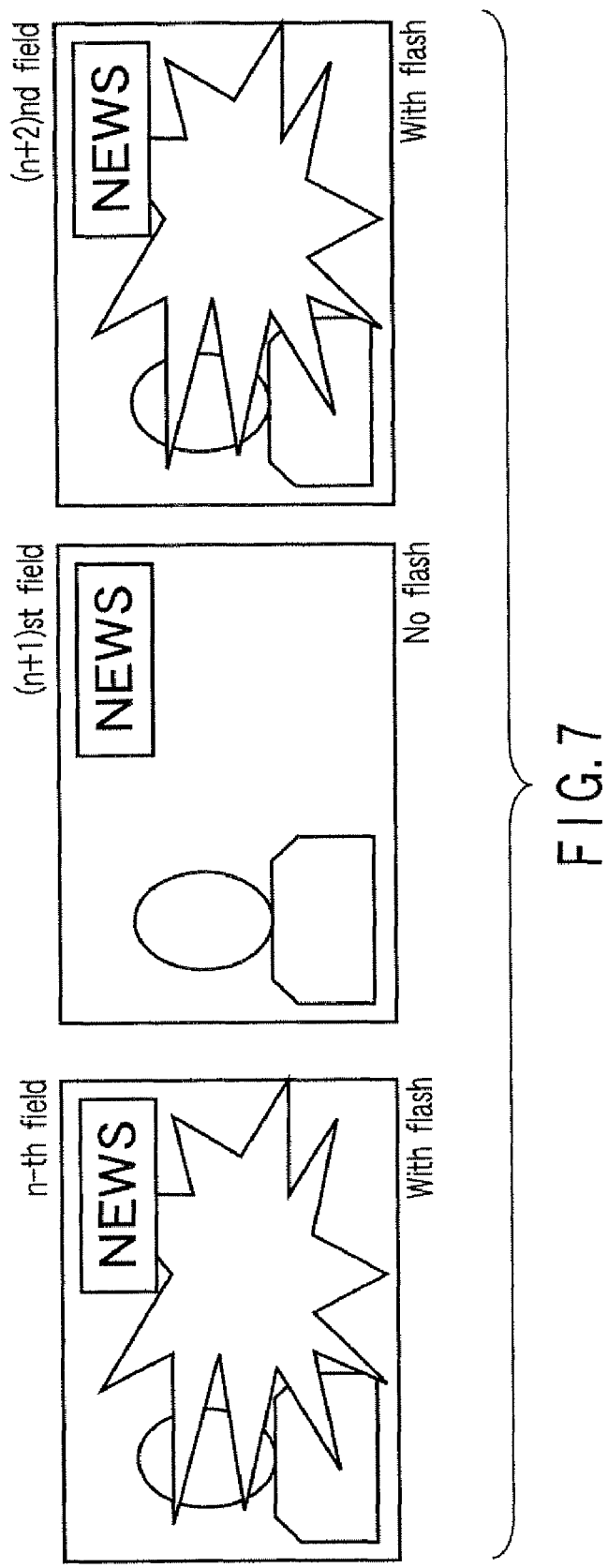
F I G. 7

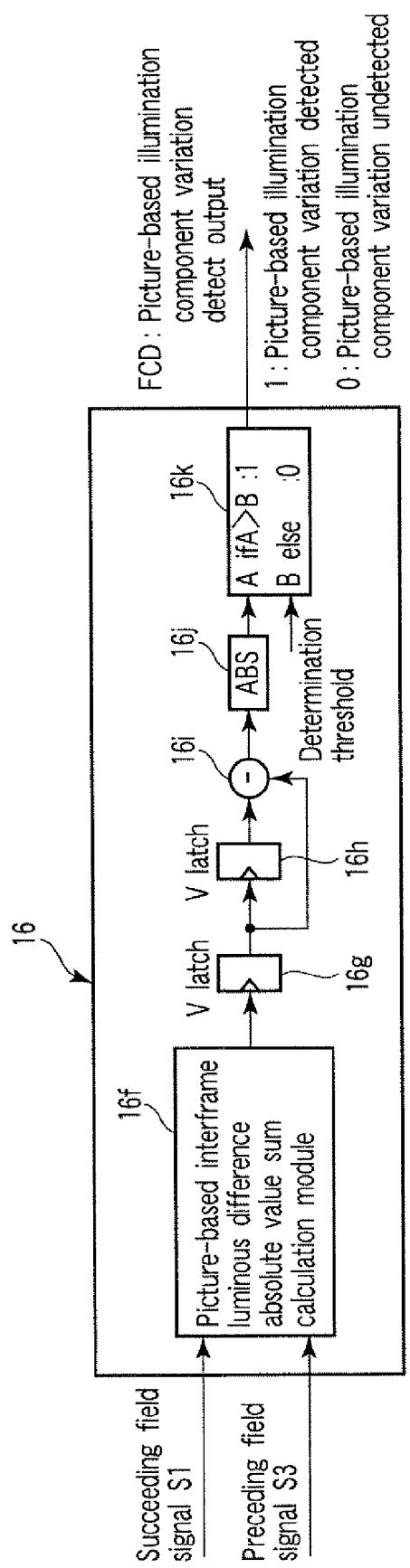
F I G. 8

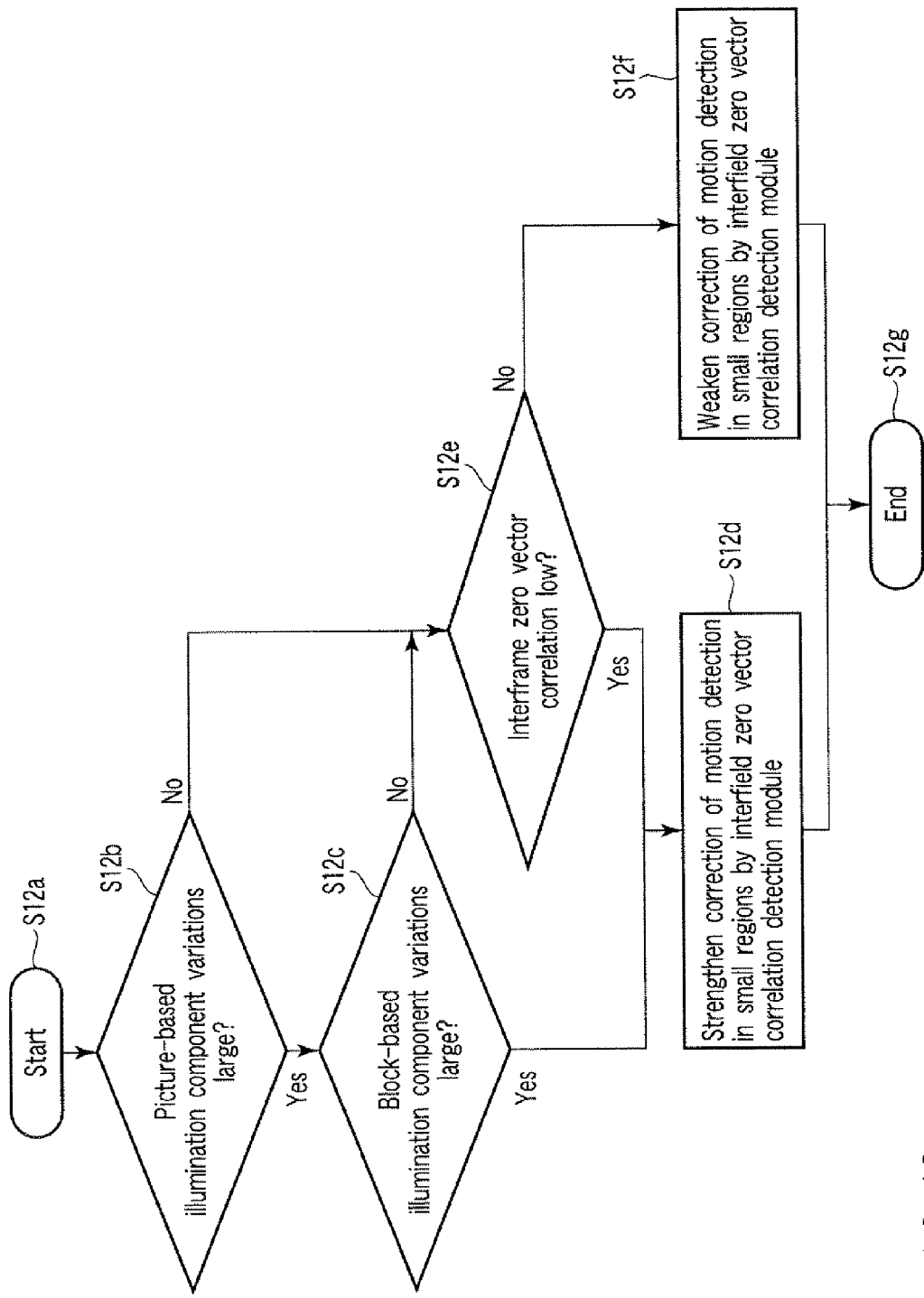
F I G. 12

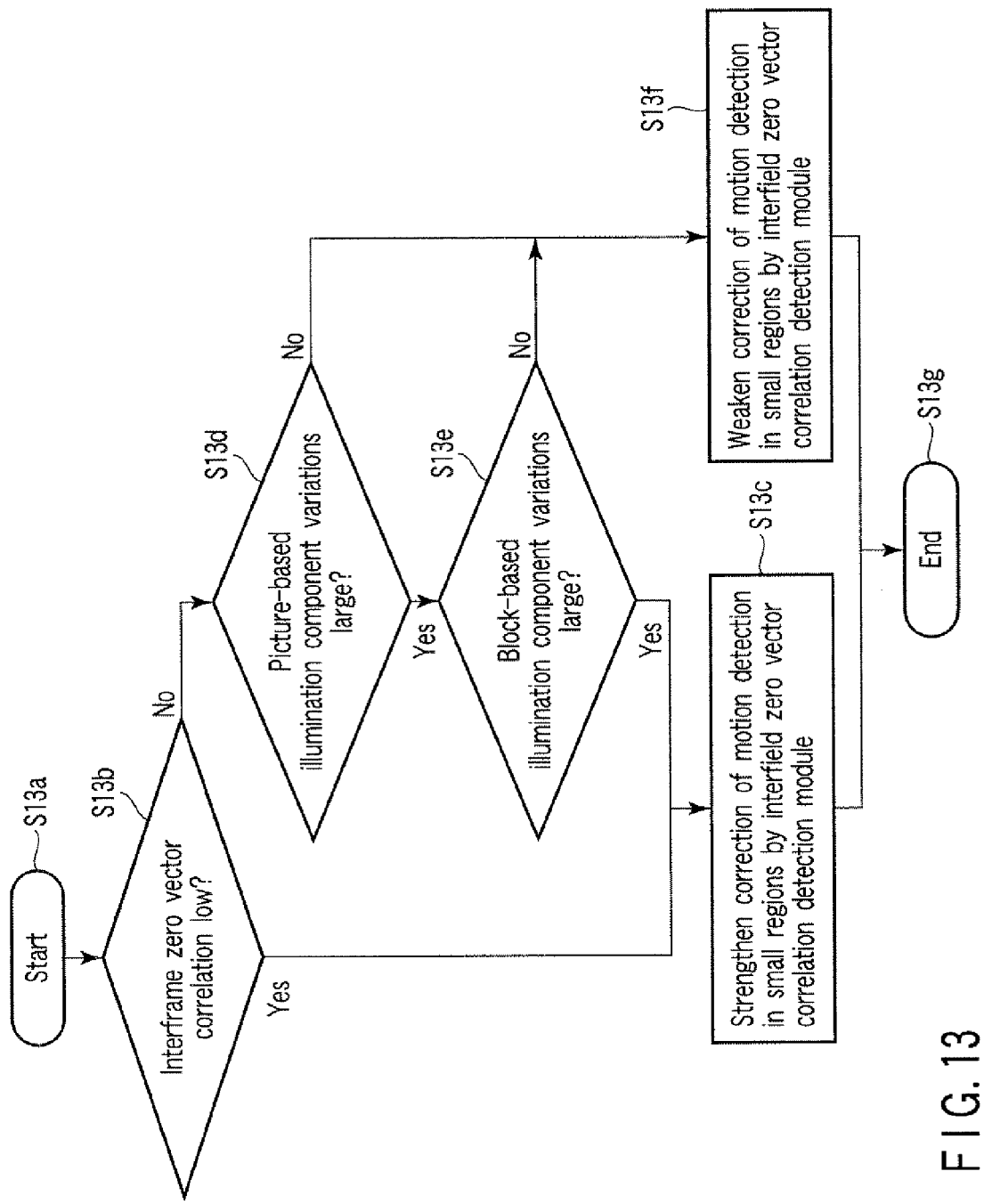
F I G. 13

SEQUENTIAL SCANNING CONVERSION DEVICE AND METHOD

CROSS REFERENCE TO RELATED APPLICATIONS

This is a Continuation Application of PCT Application No. PCT/JP2008/065063, filed Aug. 19, 2008, which was published under PCT Article 21(2) in English.

This application is based upon and claims the benefit of priority from prior Japanese Patent Application No. 2007-284095, filed Oct. 31, 2007, the entire contents of which are incorporated herein by reference.

BACKGROUND

1. Field

One embodiment of the invention relates to a motion-adaptive sequential scanning conversion device and method.

2. Description of the Related Art

As is well known, in video signal processing, sequential scanning conversion is known which converts a video signal in the form of interlaced scanning into one in the form of sequential scanning. In this sequential scanning conversion, it is required to reproduce high-quality pictures ranging from still pictures to moving pictures with no feeling of wrongness while retaining the sense of nature which is a physical factor essential to high-quality pictures.

JP-A 2000-175159 (KOKAI) discloses a video signal processing device which, in sequential scanning conversion, in order to prevent horizontal stripes from entry into sequential scanning pictures as a result of determination that a video is a still-image when a flash of a camera is set on in a moment, makes a comparison between an input signal and a signal delayed by one field to detect motion in one field to prevent degradation in picture quality due to determination that the video is a still image.

With the video signal processing device disclosed in JP-A 2000-175159, the motion of a video is detected on a field-by-field basis; it is therefore difficult to prevent erroneous determination of motion detection due to changes in video which occur in small regions within the picture. In addition, a still image having high-frequency components in the vertical direction may be determined to be a moving image, which may cause images to degrade.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is a block diagram of an example of the interfield zero vector correlation detection module in the sequential scanning conversion device;

FIG. 5 is a block diagram of an example of the picture-based illumination component variation detection module in the sequential scanning conversion device;

FIG. 7 shows exemplary pictures for which the sequential scanning conversion device of the embodiment is effective;

FIG. 8 is a block diagram of another example of the picture-based illumination component variation detection module in the sequential scanning conversion device;

FIG. 12 is a flowchart illustrating an example of the processing operation of the motion detection correction module in the modification of the sequential scanning conversion device; and FIG. 13 is a flowchart illustrating another example of the processing operation of the motion detection correction module in the modification of the sequential scanning conversion device.

DETAILED DESCRIPTION

Various embodiments according to the invention will be described hereinafter with reference to the accompanying drawings. In general, according to one embodiment of the invention, a motion detection correction module is provided which corrects the result of detection by a motion detector, which detects motion in one frame on a pixel-by-pixel basis, for each of small regions obtained by dividing the entire picture on the basis of the result of detection by a picture-based illumination component variation detector that detects interfield illumination component variations on a picture-by-picture basis and the result of detection by a block-based illumination component variation detector that detects interfield illumination component variations on a small-region-by-small-region basis.

Figure 1:
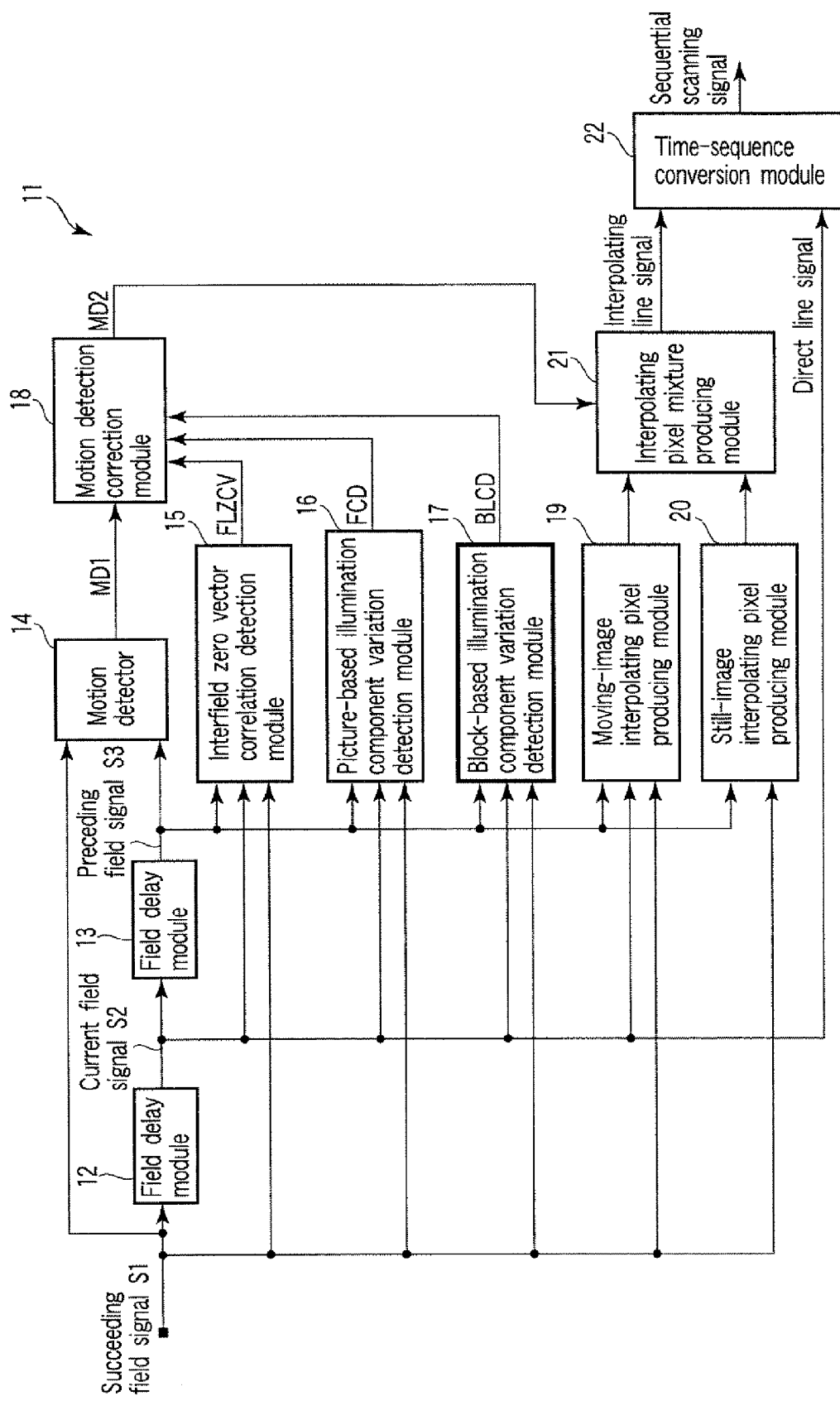
FIG. 1 is a block diagram of a sequential scanning conversion device according to an embodiment of the invention.

A sequential scanning conversion device 11 illustrated in this embodiment is equipped, as shown in FIG. 1, with two field delay modules 12 and 13, a motion detector 14, an interfield zero vector correlation detection module 15, a picture-based illumination component variation detection 16, a block-based illumination component variation detection module 17, a motion detection correction module 18, a moving-image interpolating pixel producing module 19, a still-image interpolating pixel producing module 20, an interpolating pixel mixture producing module 21, and a time-sequence conversion module 22.

The field delay module 12 is adapted to delay an input field signal by one field. In this case, an input succeeding field signal S1 is delayed by one field and then output to the field delay module 13 as a current field signal S2. The current field signal S2 is output to each of the interfield zero vector correlation detection module 15, the picture-based illumination component variation detection module 16, the block-based illumination component variation detection module 17, the moving-image interpolating pixel producing module 19, and the time-sequence conversion module 22.

The input succeeding field signal S1 is applied to each of the motion detector 14, the interfield zero vector correlation detection module 15, the picture-based illumination component variation detection module 16, the block-based illumination component variation detection module 17, the moving-image interpolating pixel producing module 19, and the still-image interpolating pixel producing module 20.

The field delay module 13 is adapted to delay an input field signal by one field. In this case, the current field signal S2 output from the field delay module 12 is delayed by one field and then output to the motion detector 14 as a preceding field signal S3. The preceding field signal S3 is output to each of the interfield zero vector correlation detection module 15, the picture-based illumination component variation detection module 16, the block-based illumination component variation detector 17, the moving-image interpolating pixel producing module 19, and the still-image interpolating pixel producing module 20.

The motion detector 14 is adapted to detect motion in one field on a pixel-by-pixel basis. That is, the motion detector 14 determines a difference between frames for each pixel on the basis of the succeeding field signal S1 and the preceding field signal S3 and produces an interframe motion detection signal MD1, which is in turn applied to the motion detection correction module 18. The motion detector 14 determines that it is a moving image as the difference becomes greater or that it is a still image as the difference becomes smaller.

The interfield zero vector correlation detection module 15 detects correlation between corresponding small regions at the same location on the screen in the current and preceding field signals S2 and S3 or in the current and succeeding field signals S2 and S1 to output a correlation detection signal FLZCV to the motion detection correction module 18. The small regions are obtained by splitting the entire picture. It is desirable for the interfield zero vector correlation detection module 15 to detect correlation between the field signal S1 or S3 and the current field signal S2 which are used in generating still-image interpolating pixels. In this case, the correlation is detected between the current field signal S2 and the preceding field signal S2.

FIG. 2 shows an example of the interfield zero vector correlation detection module 15. This interfield zero vector correlation detection module 15 is provided with a first horizontal vertical lowpass filter 15a, a second horizontal vertical lowpass filter 15b, an interfield difference absolute value calculation module 15c, and a in-small-regional integration module 15d.

The first horizontal vertical lowpass filter 15a is connected to receive the preceding field signal S3. An output signal of the first horizontal vertical lowpass filter 15a is applied to the interfield difference absolute value calculation module 15c. The second horizontal vertical lowpass filter 15b receives the current field signal S2. An output signal of the second horizontal vertical lowpass filter 15b is applied to the interfield difference absolute value calculation module 15c.

The interfield difference absolute value calculation module 15c calculates the absolute value of a signal difference between each field on a pixel basis on the basis of signals output from the first and second horizontal vertical lowpass filters 15a and 15b. The interfield difference absolute value calculation module 15c outputs the calculated interfield difference absolute value to the in-small-regional integration module 15d.

The in-small-regional integration module 15d is adapted to integrate the interfield difference absolute values in each of the small regions obtained by dividing the picture on the basis of the input interfield difference absolute values. The in-small-regional integration module 15d outputs the results of integration to the motion detection correction module 18 as an interfield zero vector correlation detection signal FLZCV.

The motion detection correction module 18 produces a motion detection correction signal MD2 obtained by correcting an interframe motion detection signal MD1 from the motion detector 14 to the moving-image determination side when it is determined that the correlation detection signal FLZCV output from the interfield zero vector correlation detection module 15 indicates low correlation and outputs it to the interpolating pixel mixture producing module 21. This prevents erroneous determination as still through the interframe motion detection and consequently the generation of erroneous interpolating noise in the sequential scanning conversion output.

Figure 3:
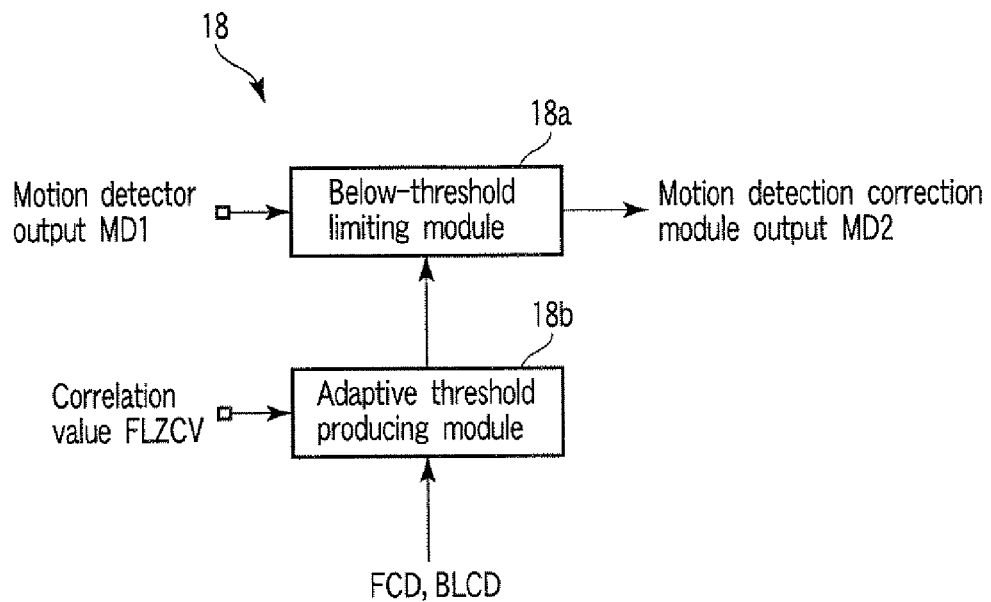
FIG. 3 is a block diagram of an example of the motion detection correction module in the sequential scanning conversion device.

It is also desirable for the motion detection correction module 18 to make a correction to limit the output of the motion detector 14 with a threshold more biased to the moving-image determination side as the output of the interfield zero vector correlation detection module 15 indicates lower correlation. A specific example for this case is illustrated in FIG. 3. As shown in FIG. 3, the motion detection correction module 18 in this case is provided with a below-threshold limiter 18a and an adaptive threshold producing module 18b.

The adaptive threshold producing module 18b is supplied with the interfield zero vector correlation detection signal FLZCV. With the signal FLZCV, the larger the value, the lower the correlation and vice versa. The adaptive threshold producing module 18b outputs a threshold which becomes larger as the interfield zero vector correlation detection signal FLZCV increases in value.

The below-threshold limiter 18a is supplied with the interframe motion detection signal MD1 output from the motion detector 14. With the interframe motion detection signal MD1, the larger the value, the higher the degree of motion (the degree of likelihood of moving image) and the smaller the value, the higher the degree of no motion (the degree of likelihood of still image).

The below-threshold limiter 18a makes a correction to limit the interframe motion detection signal MD1 from the motion detector 14 on the basis of a threshold produced by the adaptive threshold producing module 18b and outputs the result of the correction to the interpolating pixel mixture producing module 21 as the motion detection correction signal MD2 which is the output of the motion detection correction module 18.

Figure 4:
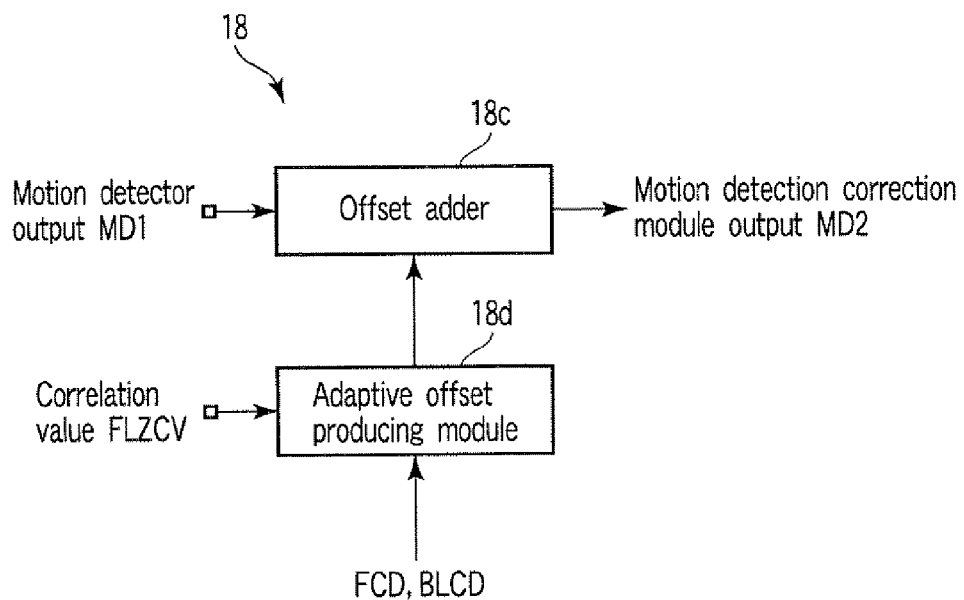
FIG. 4 is a block diagram of another example of the motion detection correction module in the sequential scanning conversion device.

It is also desirable for the motion detection correction module 18 to make a correction to add an offset to the interframe motion detection signal MD1 from the motion detector 14 so that it is biased to the moving-image determination side when the correlation detection signal FLZCV from the interfield zero vector correlation detection module 15 is determined to indicate low correlation. A specific example for this case is illustrated in FIG. 4. As shown in FIG. 4, the motion detection correction module 18 in this case is equipped with an offset adder 18c and an adaptive offset producing module 18d.

The adaptive offset producing module 18d receives the interfield zero vector correlation detection signal FLZCV. With this signal FLZCV, the larger the value, the lower the correlation and vice versa. The adaptive offset producing module 18d supplies the offset adder 18c with an offset value which increases as the interfield zero vector correlation detection signal FLZCV increases in value.

The offset adder 18c is supplied with the interframe motion detection signal MD1 output from the motion detector 14. With the interframe motion detection signal MD1, the larger the value, the higher the degree of motion (the degree of likelihood of moving image) and the smaller the value, the higher the degree of no motion (the degree of likelihood of still image).

The offset adder 18c makes a correction to add an offset value produced by the adaptive offset producing module 18d to the interframe motion detection signal MD1 from the motion detector 14 and outputs the result of correction to the interpolating pixel mixture producing module 21 as the motion detection correction signal MD2 which is the output of the motion detection correction module 18.

Referring back to FIG. 1, the motion detection correction module 18 is controlled by the detection signal FCD output from the picture-based illumination component variation detection module 16 and the detection signal BLCD output from the block-based illumination component variation detection module 17.

The picture-based illumination component variation detection module 16 detects picture-based illumination component variations among fields from the succeeding field signal S1, the current field signal S2, and the preceding field signal S3. That is, as shown in FIG. 5, the picture-based illumination component variation detection module 16 is equipped with a first in-picture average luminous level calculation module 16a, a second in-picture average luminous level calculation module 16b, a difference circuit 16c, an absolute value circuit 16d, and a comparison circuit 16e.

The first in-picture average luminous level calculation module 16a detects the average luminous level (APL: average picture level) of the current field signal S2. The second in-picture average luminous level calculation module 16b detects the average luminous level of the preceding field signal S3.

The output of the first in-picture average luminous level calculation module 16a and the output of the second in-picture average luminous level calculation module 16b are input to the difference circuit 16c. The difference circuit 16c calculates the difference between the input average luminous levels. The output of the difference circuit 16c is applied to the absolute value circuit 16d, which calculates the difference absolute value A from the input difference value.

The difference absolute value A output from the absolute value circuit 16d is applied to the comparison circuit 16e, which makes a comparison between a determination threshold B and the difference absolute value A. When the difference absolute value A is greater than the determination threshold B, the picture-based illumination component variation detection module 16 outputs a detection signal FCD to the effect that picture-based illumination component variations have been detected. When the difference absolute value A is not more than the determination threshold B, the picture-based illumination component variation detection module 16 outputs a detection signal FCD to the effect that no picture-based illumination component variation has been detected.

The block-based illumination component variation detection module 17 splits the picture into a number of small blocks (for example, 16 pixels in the horizontal direction and 3 pixels in the vertical direction) and detects interfield illumination component variations on a block-by-block basis to output a detection signal BLCD. The block-based illumination component variation detection module 17 merely detects illumination component variations on a block basis; therefore, a similar method to that shown in FIG. 5 may be used to detect the illumination component variations.

The detection signal FCD output from the picture-based illumination component variation detection module 16 and the detection signal BLCD output from the block-based illumination component variation detection module 17 are applied to the adaptive threshold producing module 18b or the adaptive offset producing module 18d in the motion detection correction module 18.

Figure 6:
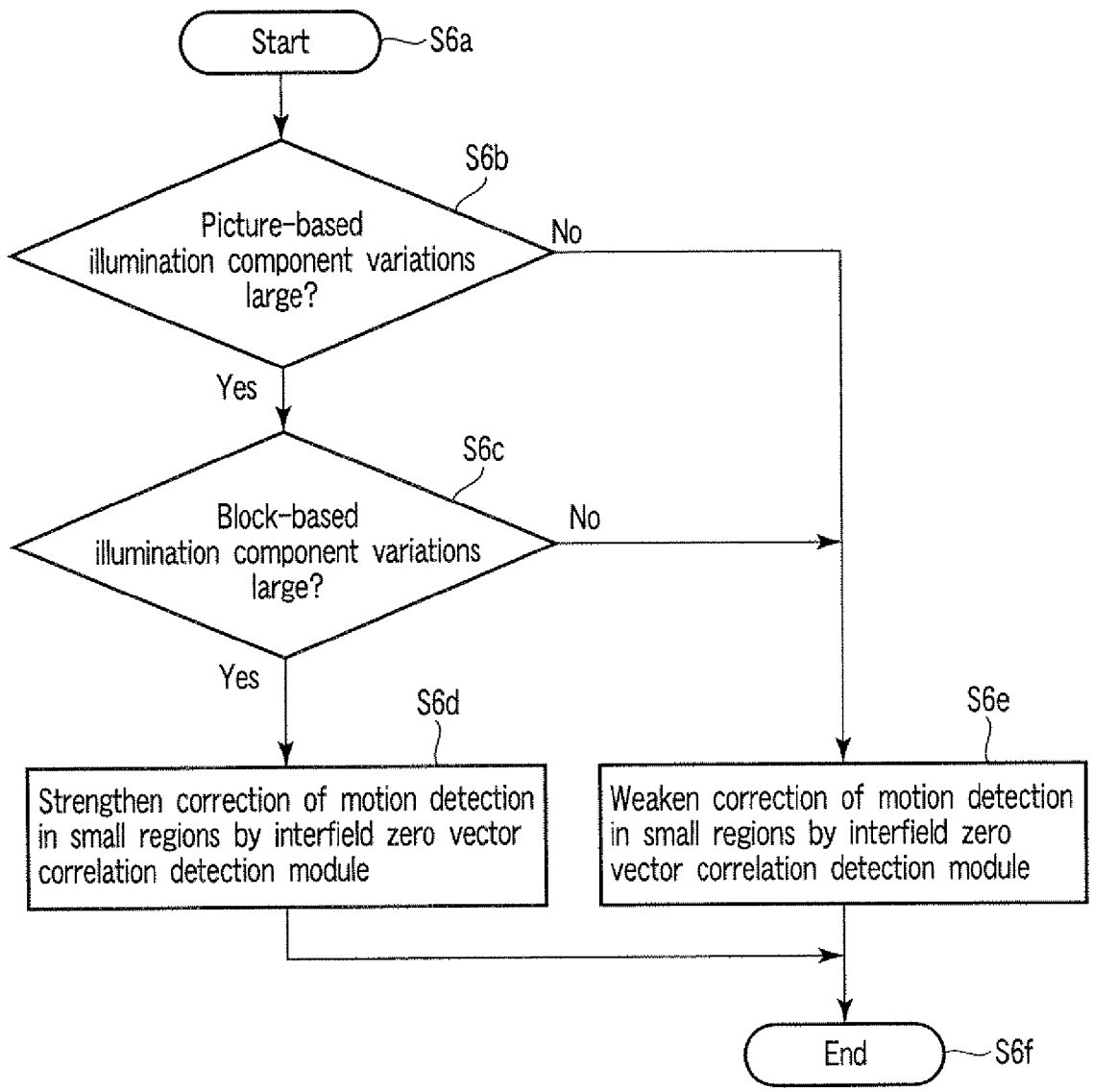
FIG. 6 is a flowchart illustrating the processing operation of the motion detection correction module in the sequential scanning conversion device.

FIG. 6 is a flowchart illustrating the processing operation of the motion detection correction module 18 based on the detection signals FCD and BLCD respectively output from the picture- and block-based illumination component variation detection module 16 and 17. That is, when processing is started (step S6a), the motion detection correction module 18 makes a determination of whether or not the detection signal FCD output from the picture-based illumination component variation detection module 16 indicates that picture-based illumination component variations have been detected (step S6b).

If the determination is that the detection signal FCD output from the picture-based illumination component variation detection module 16 indicates that picture-based illumination component variations have been detected (YES), then the motion detection correction module 18 makes a determination of whether or not the detection signal BLCD output from the block-based illumination component variation detection module 16 for each block indicates that illumination component variations have been detected (step S6c).

If the determination is that the detection signal BLCD output from the block-based illumination component variation detection module 17 indicates that illumination component variations have been detected (YES), then the motion detection correction module 18 carries out a control operation to strengthen the correction of motion detection by the interfield zero vector correlation detection signal FLZCV from the interfield zero vector correlation detection module 15 for small regions of blocks for which illumination component variations have been detected (step S6d) and then terminates the processing (step S6f).

That is, when both the picture- and block-based illumination component variation detection modules 16 and 17 detect illumination component variations, the motion detection correction module 14 corrects the interframe motion detection signal MD1 from the motion detector 14 to the moving-image side for small regions of blocks for which illumination component variations have been detected.

If the determination in step S6b is that the detection signal FCD output from the picture-based illumination component variation detection module 16 does not indicate that picture-based illumination component variations have been detected (NO), or if the determination in step S6c is that the detection signal BLCD output from the block-based illumination component variation detection module 17 does not indicate that block-based illumination component variations have been detected (NO), then the motion detection correction module 18 carries out a control operation to weaken the correction of motion detection by the interfield zero vector correlation detection signal FLZVC from the interfield zero vector correlation detection module 15 for small regions of blocks in which illumination component variations have not been detected (step S6e) and terminates the processing (step S6f).

That is, when illumination component variations are not detected by at least one of the picture- and block-based illumination component variation detection modules 16 and 17, the motion detection correction module 14 corrects the interframe motion detection signal MD1 from the motion detector 14 to the still-image side for small regions of blocks for which no illumination component variations have been detected.

Next, a description is given of advantages brought about by making corrections on the interframe motion detection signal MD1 from the motion detector 14 on a small region basis on the basis of the detection signals FCD and BLCD output from the picture- and block-based illumination component variation detection modules 16 and 17 as described above.

That is, in the interframe motion detection by the motion detector 14, erroneous interpolating noise is produced in the output of the sequential scanning conversion output when it is erroneously determined to be a still image. To prevent this, the motion detection correction is made by the motion detection correction module 18 using the interfield zero vector correlation detection module 15.

However, with a still image having high-frequency components in the vertical direction, the high-frequency components fold back by carrying out interlaced scanning, causing a difference between top and bottom fields. This causes the interfield zero vector correlation detection signal FLZCV to go low, causing the motion detection result MD1 to be corrected toward the moving-image determination side. This will cause or threaten degradation in picture quality, such as flicker of output image.

For this reason, picture-based illumination component variations FCD are detected for moving images in which erroneous interpolating noise tends to appear, the entire screen instantly becomes bright due to a camera flash by way of example, and the brightness greatly changes from field to field. On the basis of a flowchart shown in FIG. 6, when the variations FCD are large, it is determined that the scene contains a flash, in which case the correction of the interframe motion detection result MD1 is strengthened over the entire screen. When the variations FCD are not large, the correction of the interframe motion detection result MD1 is weakened over the entire screen. By so doing, it becomes possible to properly determine a scene that contains a flash, thus allowing erroneous determination of motion detection to be compensated for effectively and the effects on a still-image scene having high-frequency components in the vertical direction to be eliminated.

Let the preceding field, the current field and the succeeding field be the n-th field, the (n+1)st field, and the (n+2)nd field, respectively. Consider, as shown in FIG. 7 that a flash is set on in each of the n-th and (n+2)nd fields and consequently the whole is brightened, and the flash is set off in the (n+1)st field and consequently the whole becomes dark.

In such a case, almost all of the interframe motion detection results MD1 between the n-th and (n+2)nd fields for the (n+1)st field sequential scanning conversion will indicate the still-image determination. The image in the n-th field which is bright overall is inserted as interpolating line signals, thus causing degradation in picture quality in the form of horizontal stripes.

For such moving images, it becomes possible to compensate for erroneous determination of interframe motion detection over the entire screen by detecting the picture-based illumination component variations FCD. When a telop (NEWS) is displayed in the upper right-hand portion of the screen as in the moving image shown in FIG. 7, the telop remains still regardless of variations due to a flash. However, when the telop contains high-frequency components in the vertical direction, correction is made to the moving-image determination side from the above reason because the correction of the motion detection signal MD1 is made over the entire screen. This will cause or threaten degradation in picture quality, such as flicker of output image. It is therefore required to determine regions where correction is required for effective motion detection correction.

That is, when both the picture-based illumination component variation FCD and the block-based illumination component variation BLCD are large, control is carried out so as to strengthen the correction of motion detection by the interfield zero vector correlation detection module 15 within the range of small regions for which variations have been detected and weaken the correction of motion detection within other regions.

Such a control method can prevent erroneous determination of interframe motion detection over a large range of the screen which occurs when a flash is set on and off and suppress the motion detection compensation even if a still portion, such as telop, on the screen contains high-frequency components in the vertical direction, thus allowing effective motion detection without degradation in picture quality, such as flicker.

The moving-image interpolating pixel producing module 19 is adapted to produce interpolating pixels for moving image from any one of the current field signal S2, the preceding field signal S3, and the succeeding field signal S1. In this embodiment, the moving-image interpolating pixel producing module 19 produces moving-image interpolating pixels from the current field signal S2 through in-field interpolation and outputs the produced moving-image interpolating pixels to the interpolating pixel mixture producing module 21. The moving-image interpolating pixel producing module 19 may produce interpolating pixels using the preceding and succeeding fields as well through motion compensation.

The still-image interpolating pixel producing module 20 produces interpolating pixels for still image from the preceding field signal or the succeeding field signal. In this embodiment, the still-image interpolating pixel producing module 20 outputs pixels in the preceding field signal S3 at the same spatial location as interpolating pixels to the interpolating pixel mixture producing module 21 as still-image interpolating pixels. The still-image interpolating pixel producing module 20 may use pixels in the succeeding field signal S1 as still-image interpolating pixels or the average of pixels in the preceding field signal S3 and the succeeding field signal S1.

The interpolating pixel mixture producing module 21 is adapted to mix still-image interpolating pixels and moving-image interpolating pixels while increasing the percentage of still-image interpolating pixels as the output of the motion detector 14 shifts to the still-image determination side and increasing the percentage of moving-image interpolating pixels as the output of the motion detector 14 shifts to the moving-image determination side. Assuming that the determination shifts more to the moving-image side as the output MD2 of the motion detection correction module 18 increases in value and to the still-image side as the output value decreases, the interpolating pixel mixture producing module 21 mixes the moving-image interpolating pixels and the still-image interpolating pixels in accordance with the following expression:

$$\text{interpolating line signal} = MD2 \times \text{moving-image interpolating pixels} + (1-MD2) \times \text{still-image interpolating pixels}$$

where MD2 is set such that $0 \leq MD2 \leq 1$.

The time-sequence conversion module 22 is adapted to produce and output a sequential scanning conversion signal on the basis of an interpolating line signal output from the interpolating pixel mixture producing module 21 and a direct line signal which is the current field signal S2.

FIG. 8 shows another example of the picture-based illumination component variation detection module 16, which has a picture-based interframe luminous difference absolute value sum calculation module 16*f*, two V latches 16*g* and 16*h*, a difference circuit 16*i*, an absolute value circuit 16*j*, and a comparison circuit 16*k*.

The picture-based interframe luminous difference absolute value sum calculation module 16f is connected to receive the succeeding field signal S1 and the preceding field signal S3 to detect the sum of absolute differences (SAD) between the field signals S1 and S3.

The output of the picture-based interframe luminous difference absolute value sum calculation module 16f is input to the V latch 16g. The V latch 16g, which delays an input signal by one vertical period, outputs the input difference absolute sum to the V latch 16h and the difference circuit 16i as the sum of absolute differences of one vertical period before. The V latch 16h further delays the sum of absolute differences of one vertical period before by one vertical period and output it to the difference circuit 16i as the sum of absolute differences of two vertical periods before.

The difference circuit 16i calculates the difference between the sums of absolute differences of one and two vertical periods before. The difference value output from the difference circuit 16i is input to the absolute value circuit 16j, which calculates the difference absolute value A from the input difference value.

The difference absolute value A output from the absolute value circuit 16j is input to the comparison circuit 16k, which makes a comparison between the difference absolute value A and a determination threshold B. That is, when the difference absolute value A is greater than the determination threshold B, the picture-based illumination component variation detection module 16 outputs a detection signal FCD to the effect that picture-based illumination component variations have been detected. When the difference absolute value A is less than the determination threshold B, the picture-based illumination component variation detection module 16 outputs a detection signal FCD to the effect that no picture-based illumination component variations have been detected.

Figure 9:
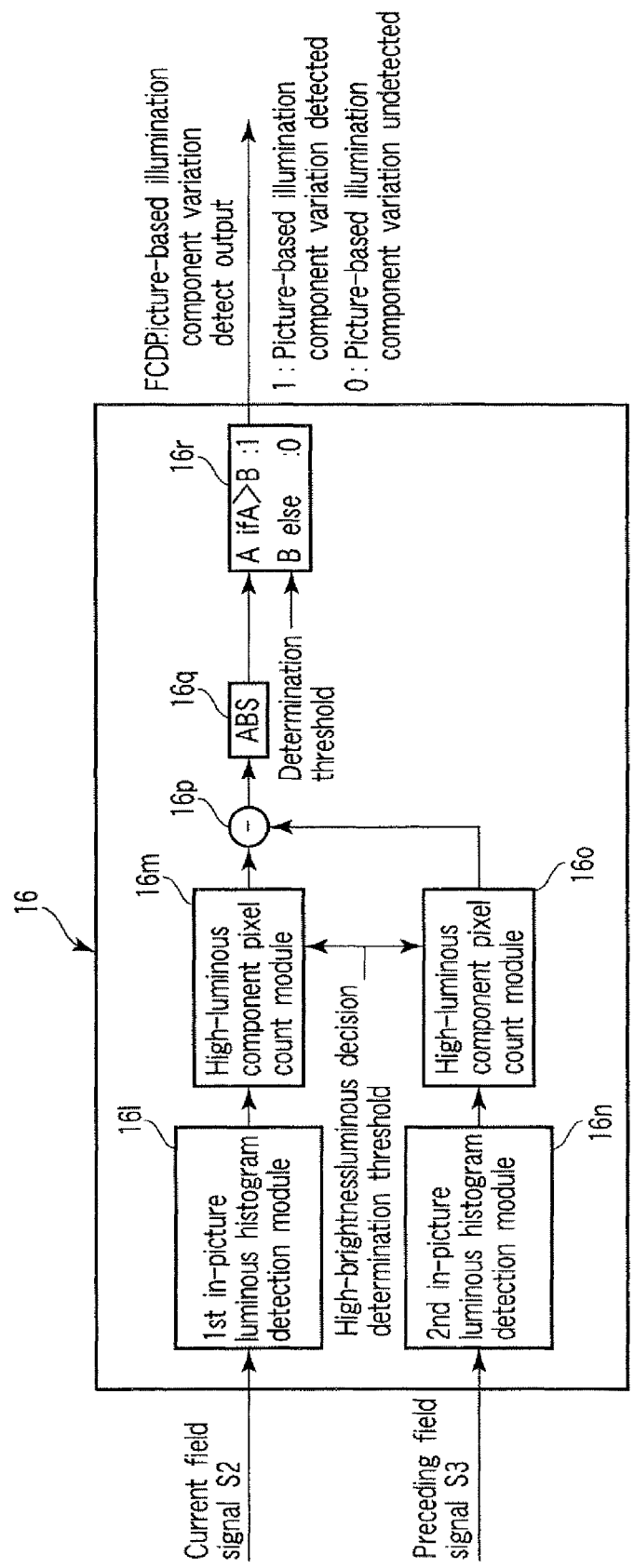
FIG. 9 is a block diagram of still another example of the picture-based illumination component variation detection module in the sequential scanning conversion device.

FIG. 9 shows still another example of the picture-based illumination component variation detection module 16. This picture-based illumination component variation detection module 16 comprises a first in-picture luminous histogram detection module 16l, a first high-luminous component pixel count module 16m, a second in-picture luminous histogram detection module 16n, a second high-luminous component pixel count module 16o, a difference circuit 16p, an absolute value circuit 16q, and a comparison circuit 16r.

The first in-picture luminous histogram detection module 16l is supplied with the current field signal S2 to detect an in-picture luminous histogram of the current field signal S2. The in-picture luminous histogram output from the first in-picture luminous histogram detection module 16l is input to the first high-luminous component pixel count module 16m.

The first high-luminous component pixel count module 16m counts the number of pixels each having a luminous higher than a high-luminous determination threshold from the input in-picture luminous histogram and outputs the result to the difference circuit 16p.

The second in-picture luminous histogram detection module 16n is supplied with the preceding field signal S3 to detect an in-picture luminous histogram of the preceding field signal S3. The in-picture luminous histogram output from the second in-picture luminous histogram detection module 16n is input to the second high-luminous component pixel count module 16o.

The second high-luminous component pixel count module 16o counts the number of pixels each having a luminous higher than the high-luminous determination threshold from the input in-picture luminous histogram and outputs the result to the difference circuit 16p.

The difference circuit 16p calculates the difference in number between the high-luminous component pixels in the current field signal S2 and those in the preceding field signal S3. The difference value from the difference circuit 16p is input to the absolute value circuit 16q, which calculates the absolute value of the input difference value and outputs it to the comparison circuit 16r as the difference absolute value A.

The comparison circuit 16r makes a comparison between the difference absolute value A input from the absolute value circuit 16q and a determination threshold B. That is, when the difference absolute value A is greater than threshold B, the picture-based illumination component variation detection module 16 outputs a detection signal FCD indicating that the picture-based illumination component variations have been detected. When the difference absolute value A is not greater than threshold B, the picture-based illumination component variation detection module 16 outputs a detection signal FCD to the effect that no picture-based illumination component variations have been detected.

Figure 10:
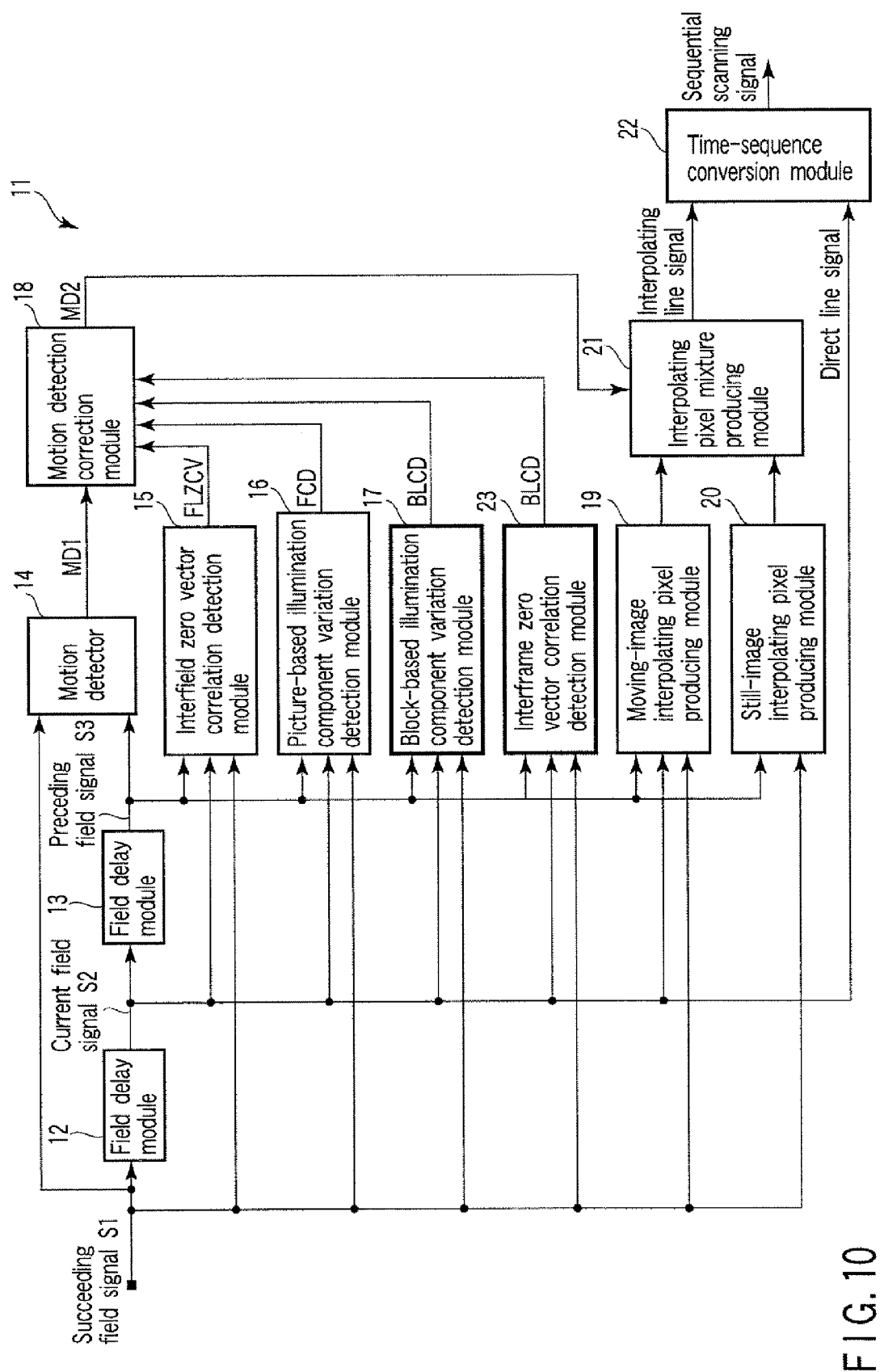
FIG. 10 is a block diagram of a modification of the sequential scanning device of the embodiment.

FIG. 10 shows a modification of the embodiment described above. In FIG. 10, corresponding parts to those in FIG. 1 are denoted by like reference numbers and only different portions are described herein. That is, the succeeding field signal S1 and the preceding field signal S3 are applied to an interframe zero vector correlation detection module 23.

This interframe zero vector correlation detection module 23 detects correlation between small regions, obtained by dividing the entire picture, at the same location on the screen in the preceding and succeeding field signals S3 and S1 and produces an interframe zero vector correlation detection signal FMZCV, which is in turn input to the motion detection correction module 18.

Figure 11:
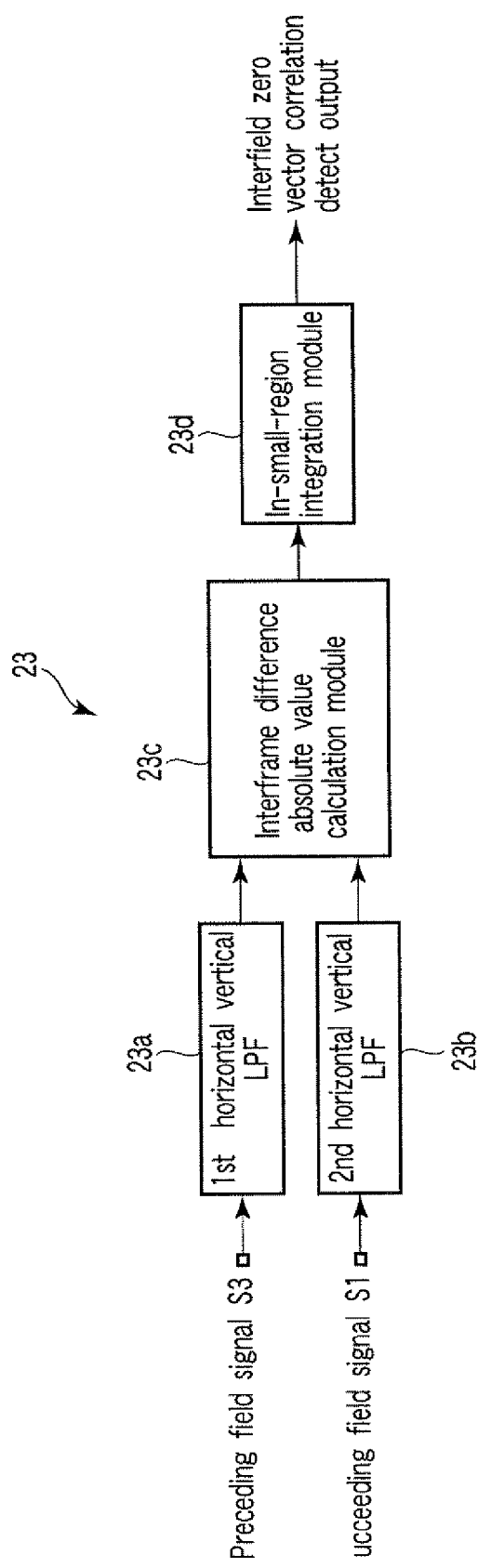
FIG. 11 is a block diagram of an example of the interframe zero vector correlation detection module in the modification of the sequential scanning conversion device.

FIG. 11 shows an example of the interframe zero vector correlation detection module 23. This interframe zero vector correlation detection module 23 comprises a first horizontal vertical lowpass filter 23a, a second horizontal vertical lowpass filter 23b, an interframe difference absolute value calculation module 23c, and an in-small-region integration module 23d.

The first horizontal vertical lowpass filter 23a is supplied with the preceding field signal S3. An output signal of the first horizontal vertical lowpass filter 23a is applied to the interframe difference absolute value calculation module 23c. The second horizontal vertical lowpass filter 23b is supplied with the succeeding field signal S1. An output signal of the second horizontal vertical lowpass filter 23b is applied to the interframe difference absolute value calculation module 23c.

The interframe difference absolute value calculation module 23c receives the output signals of the first and second horizontal vertical lowpass filters 23a and 23b to calculate the absolute value of the signal difference between each frame on a pixel basis. The interframe difference absolute value calculation module 23c outputs the calculated interframe difference absolute values to the in-small-region integration module 23d.

The in-small-region integration module 23d integrates, for each small region, the interframe difference absolute values in it. The in-small-region integration module 23d outputs the results of integration to the adaptive threshold producing module 18b or the adaptive offset producing module 18d in the motion detection correction module 18 as an interframe zero vector correlation detection signal FMZCV.

FIG. 12 is a flowchart illustrating the processing operation of the motion detection correction module 18 based on the detection signals FCD, BLCD and FMZCV which are output from the picture-based illumination component variation detecting module 16, the block-based illumination component variation detecting module 17, and the interframe zero vector correlation detection module 23, respectively.

That is, when the processing is started (step S12a), the motion detection correction module 18 makes, in step S12b, a determination of whether or not the detection signal FCD output from the picture-based illumination component variation detecting module 16 indicates that picture-based illumination component variations have been detected.

If the determination is that the detection signal FCD output from the picture-based illumination component variation detecting module 16 indicates that picture-based illumination component variations have been detected (YES), the motion detection correction module 18 makes, in step S12c, a determination of whether or not the block-based detection signal BLCD output from the block-based illumination component variation detecting module 17 indicates that illumination component variations have been detected.

If the determination is that the detection signal BLCD output from the block-based illumination component variation detecting module 17 indicates that illumination component variations have been detected (YES), the motion detection correction module 18 carries out, in step S12d, a control operation to strengthen the correction of motion detection by the interfield zero vector correlation detection signal FLZCV output from the interfield zero vector correlation detection module 15 for small regions of blocks where illumination component variations have been detected and then terminates the processing (step S12g).

That is, when illumination component variations are detected by both the picture- and block-based illumination component variation detecting modules 16 and 17, the motion detection correction module 14 corrects the interframe motion detection signal MD1 from the motion detector 14 to the moving-image side for small regions of blocks where illumination component variations have been detected.

If, on the other hand, the determination in step S12b is that the detection signal FCD output from the picture-based illumination component variation detecting module 16 does not indicate that illumination component variations have been detected (NO) or the determination in step S12c is that the detection signal BLCD output from the block-based illumination component variation detecting module 17 does not indicate that illumination component variations have been detected (NO), then the motion detection correction module 18 makes, in step S12e, a determination of whether or not the interframe zero vector correlation detection signal FMZCV from the interframe zero vector correlation detection module 23 indicates that correlation is low.

If the determination is that the interframe zero vector correlation detection signal FMZCV indicates that correlation is low (YES), the motion detection correction module 18 carries out, in step S12d, a control operation to strengthen the correction of motion detection by the interfield zero vector correlation detection signal FLZCV output from the interfield zero vector correlation detection module 15 for small regions where low correlation has been detected and then terminates the processing (step S12g).

That is, if, even when illumination component variations are not detected by both the picture- and block-based illumination component variation detecting modules 16 and 17, the interframe zero vector correlation detection signal FMZCV output from the interframe zero vector correlation detection module 23 indicates that correlation is low, the motion detection correction module 14 corrects the interframe motion detection signal MD1 from the motion detector 14 to the moving-image side for small regions detected to be low in correlation.

If the determination in step S12e is that the interframe zero vector correlation detection signal FMZCV indicates that correlation is high (NO), the motion detection correction module 18 carries out, in step S12f, a control operation to weaken the correction of motion detection by the interfield zero vector correlation detection signal FLZCV output from the interfield zero vector correlation detection module 15 for small regions detected to be low in correlation and then terminates the processing (step S12g).

That is, if the interframe zero vector correlation detection signal FMZCV output from the interframe zero vector correlation detection module 23 indicates that correlation is low, then the motion detection correction module 14 corrects the interframe motion detection signal MD1 from the motion detector 14 to the still-image side for small regions detected to be high in correlation.

According to the configuration shown in FIG. 10, the correction of motion detection is strengthened for small regions detected to be low in correlation is low if the interframe zero vector correlation detection signal FMZCV indicates that correlation is low even when picture- and block-based illumination component variations are not detected.

Thereby, in addition to the advantages of the sequential scanning conversion device 11 shown in FIG. 1, a control operation of motion detection correction to prevent erroneous determination can be carried out by accurately recognizing regions containing high-frequency components in the vertical direction even with videos having no illumination component variation due to flashing or the like over the entire picture.

FIG. 13 is a flowchart illustrating the processing operation of the motion detection correction module 18 based on the detection signals FCD, BLCD and FMZCV which are output from the picture-based illumination component variation detecting module 16, the block-based illumination component variation detecting module 17, and the interframe zero vector correlation detection module 23, respectively.

That is, when the processing is started (step S13a), the motion detection correction module 18 makes, in step S13b, a determination of whether or not the interframe zero vector correlation detection signal FMZCV output from the interframe zero vector correlation detection module 23 indicates that correlation is low.

If the determination is that the interframe zero vector correlation detection signal FMZCV indicates low correlation (YES), the motion detection correction module 18 carries out, in step S13c, a control operation to weaken the correction of motion detection by the interfield zero vector correlation detection signal FLZCV output from the interfield zero vector correlation detection module 15 for small regions for which low correlation has been detected and then terminates the processing (step S13g).

That is, if the interframe zero vector correlation detection signal FMZCV output from the interframe zero vector correlation detection module 23 indicates low correlation, the motion detection correction module 14 corrects the interframe motion detection signal MD1 from the motion detector 14 to the moving-image side for small regions detected to be low in correlation regardless of the results of detection by the picture- and block-based illumination variation detecting modules 16 and 17.

If, on the other hand, the determination in step S13b is that the interframe zero vector correlation detection signal FMZCV indicates that correlation is high (NO), the motion detection correction module 18 makes, in step S13d, a determination of whether or not the detection signal FCD output from the picture-based illumination component variation detection module 16 indicates that picture-based illumination component variations have been detected.

If the determination is that the detection signal FCD output from the picture-based illumination component variation detection module 16 indicates that picture-based illumination component variations have been detected (YES), the motion detection correction module 18 makes, in step S13e, a determination of whether or not the block-based detection signal BLCD output from the block-based illumination variation detection module 17 indicates that illumination component variations have been detected.

If the determination is that the detection signal BLCD output from the block-based illumination variation detection module 17 indicates that illumination component variations have been detected (YES), the motion detection correction module 18 performs, in step S13c, a control operation to weaken the correction of motion detection by the interfield zero vector correlation detection signal FLZCV output from the interframe zero vector correlation detection module 23 for small regions of blocks for which illumination component variations have been detected and then terminates the processing (step S13g).

That is, if illumination component variations have been detected by the picture- and block-based illumination component variation detection modules 16 and 17, the motion detection correction module 14 corrects the interframe motion detection signal MD1 from the motion detector 14 to the moving-image side for small regions of blocks for which illumination component variations have been detected.

If, on the other hand, the determination in step S13d is that the detection signal FCD output from the picture-based illumination component variation detection module 16 does not indicate that picture-based illumination component variations have been detected (NO), or the determination in step S13e is that the detection signal BLCD output from the block-based illumination variation detection module 17 does not indicates that illumination component variations have been detected (NO), the motion detection correction module 18 performs, in step S13f, a control operation to weaken the correction of motion detection by the interfield zero vector correlation detection signal FLZCV output from the interfield zero vector correlation detection module 15 for small regions of blocks for which illumination component variations have not been detected and then terminates the processing (step S13g).

That is, if illumination component variations have not been detected by at least one of the picture- and block-based illumination component variation detection modules 16 and 17, the motion detection correction module 14 corrects the interframe motion detection signal MD1 from the motion detector 14 to the still-image side for small regions of blocks for which illumination component variations have not been detected.

In the processing operation of FIG. 13, the sequence of the processing in steps S12b and S12c and the processing in step S12e in FIG. 12 is reversed.

According to the embodiment, the results of detection by a motion detector that detects the motion of each pixel in one frame are corrected for each of small regions into which the entire picture is divided on the basis of the results of detection of picture-based and small-region-based interfield illumination component variations, allowing the correction of motion detection to be made more effectively and degradation in picture quality to be avoided.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A sequential scanning conversion device comprising:
   a motion detector configured to detect motion in one frame for each pixel;
   a still-image interpolating pixel producing module configured to produce interpolating pixels for still images using either of the preceding and succeeding field signals;
   a moving-image interpolating pixel producing module configured to produce interpolating pixels for moving images using any one of the current, preceding and succeeding field signals;
   an interpolating pixel mixture producing module configured to mix the still-image interpolating pixels and the moving-image interpolating pixels while increasing the percentage of the still-image interpolating pixels as the result of detection by the motion detector is shifted to the still-image determination side and increasing the percentage of the moving-image interpolating pixels as the result of detection by the motion detector is shifted to the moving-image determination side;
   an interfield zero vector correlation detector configured to detect correlation between corresponding small regions at the same screen location in the current and preceding field signals or the current and succeeding field signals, the small regions being obtained by dividing the entire screen;
   a picture-based illumination component variation detector configured to detect illumination component variations between fields on a picture-by-picture basis using any one of the current, preceding and succeeding field signals;
   a block-based illumination component variation detector configured to detect illumination component variations between fields on a small-region-by-small-region basis using any one of the current, preceding and succeeding field signals; and
   a motion detection correction module configured to correct the result of detection by the motion detector on the basis of the result of detection by the interfield zero vector correlation detector and correct the result of detection by the motion detector on a small-region-by-small-region basis on the basis of the results of detection by the picture- and block-based illumination component variation detector.

2. The sequential scanning conversion device of claim 1, wherein the motion detection correction module is configured to correct the result of detection by the motion detector to the moving-image side for small regions for which picture-based illumination component variations have been detected by the picture-based illumination component variation detector and illumination component variations have been detected by the block-based illumination component variation detector.

3. The sequential scanning conversion device of claim 1, wherein the motion detection correction module is configured to correct the result of detection by the motion detector to the still-image side for small regions for which illumination component variations have not been detected by either of the picture-based illumination component variation detector and the block-based illumination component variation detector.

4. The sequential scanning conversion device of claim 1, further comprising an interframe zero vector correlation detector configured to detect correlation between corresponding small regions at the same screen location in the preceding and succeeding field signals, and wherein the motion detection correction module is configured to correct the result of detection by the motion detector on a small-region-by-small-region basis on the basis of the results of detection by the picture- and block-based illumination component variation detectors and the interframe zero vector correlation detector.

5. The sequential scanning conversion device of claim 4, wherein the motion detection correction module is configured to correct the result of detection by the motion detector to the moving-image side for small regions for which illumination component variations have not been detected by either of the picture-based illumination component variation detector and the block-based illumination component variation detector but the result of detection by the interframe zero vector correlation indicates that correlation is low.

6. The sequential scanning conversion device of claim 4, wherein the motion detection correction module is configured to correct the result of detection by the motion detector to the still-image side for small regions for which illumination component variations have not been detected by either of the picture-based illumination component variation detector and the block-based illumination component variation detector but the result of detection by the interframe zero vector correlation indicates that correlation is high.

7. The sequential scanning conversion device of claim 4, wherein the motion detection correction module is configured to correct the result of detection by the motion detector to the moving-image side for small regions for which the result of detection by the interframe zero vector correlation indicates that correlation is low.

8. A sequential scanning conversion method comprising:
detecting motion in one frame on a pixel-by-pixel basis;
producing interpolating pixels for still images using either of the preceding and succeeding field signals;
producing interpolating pixels for moving images using any one of the current, preceding and succeeding field signals;
mixing the still-image interpolating pixels and the moving-image interpolating pixels while increasing the percentage of the still-image interpolating pixels as the result of motion detection is shifted to the still-image determination side and increasing the percentage of the moving-image interpolating pixels as the result of motion detection is shifted to the moving-image determination side;
detecting correlation between corresponding small regions at the same screen location in the current and preceding field signals or the current and succeeding field signals, the small regions being obtained by dividing the entire screen;
detecting illumination component variations between fields on a picture-by-picture basis using any one of the current, preceding and succeeding field signals;
detecting illumination component variations between fields on a small-region-by-small-region basis using any one of the current, preceding and succeeding field signals; and
correcting the result of detection by the motion detection module on the basis of the result of detection of the interfield zero vector correlation and correcting the result of motion detection on a small-region-by-small-region basis on the basis of the results of detection of picture- and block-based illumination component variations.

9. The sequential scanning conversion method of claim 8, further comprising detecting correlation between corresponding small regions at the same screen location in the preceding and succeeding field signals, and wherein the step of detecting motion corrects the result of motion detection on a small-region-by-small-region basis on the basis of the results of detection of the picture- and block-based illumination component variations and the result of detection of the interframe zero vector correlation.

* * * * *